United States Patent
Nakamura

(10) Patent No.: US 6,633,873 B1
(45) Date of Patent: Oct. 14, 2003

(54) DISTRIBUTED DATA RETRIEVAL SYSTEM INCLUDING MECHANISM FOR PREDICTING AN AMOUNT OF RESPONSE DATA

(75) Inventor: Naohito Nakamura, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/375,388

(22) Filed: Aug. 17, 1999

(30) Foreign Application Priority Data

Feb. 16, 1999 (JP) .......................................... 11-037765

(51) Int. Cl.$^7$ ............................. G06F 17/30; G06F 7/00
(52) U.S. Cl. ............................. 707/10; 707/3; 709/203; 709/219
(58) Field of Search ....................... 707/10, 3; 709/203, 709/219

(56) References Cited

U.S. PATENT DOCUMENTS

| | | | |
|---|---|---|---|
| 4,774,655 A | * 9/1988 | Kollin et al. ................... | 707/4 |
| 5,649,186 A | * 7/1997 | Ferguson ...................... | 707/10 |
| 5,692,179 A | * 11/1997 | Ueda ............................. | 707/9 |
| 5,758,146 A | * 5/1998 | Schiefer et al. ................ | 707/2 |
| 5,761,496 A | * 6/1998 | Hattori .......................... | 707/5 |
| 5,778,353 A | * 7/1998 | Schiefer et al. ................ | 707/2 |
| 5,832,488 A | * 11/1998 | Eberhardt ..................... | 707/10 |
| 5,884,309 A | * 3/1999 | Vanechanos, Jr. ............ | 707/10 |
| 5,899,991 A | * 5/1999 | Karch ........................... | 707/5 |
| 5,915,249 A | * 6/1999 | Spencer ......................... | 707/5 |
| 5,956,716 A | * 9/1999 | Kenner et al. ................. | 707/10 |
| 6,105,034 A | * 8/2000 | Buckler ....................... | 707/103 |
| 6,212,518 B1 | * 4/2001 | Yoshida et al. ................ | 707/5 |

FOREIGN PATENT DOCUMENTS

JP      10-63681 A   * 3/1998   ........... G06F/17/30

OTHER PUBLICATIONS

Gravano, L., Garcia–Molina, H. and Tomasic, A. "GlOSS: Text–Source Discovery over the Internet", ACM Transactions on Database Systems, vol. 24, No. 2, 1999, pp. 229–264.*

Garcia–Molina, H., Gravano, L. and Shivakuma, N. "dSCAM: Finding Document Copies Across Multiple Databases", Proceedings of the 4th International Conference on Parallel and Distributed Information Systems, 1996.*

Flater, D.W. and Yesha, Y. "Properties of Networked Retrieval with ALIBI" Proceedings of the 2$^{nd}$ International Conference on Information and Knowledge Management (CIKM '93), Nov. 1993, pp. 31–38.*

Simpson, P. "Query Processing in a Heterogeneous Retrieval Network", Proceedings of the 11$^{th}$ Annual Conference on Research and Development in Information Retrieval, 1988, pp. 359–370.*

Moulinoux, C., Faure, J. and Litwiin, W. "MESSIDOR System", Proceedings of the 1981 ACM SIGSMALL Symposium on Smal Systems, 1981, pp. 130–135.*

(List continued on next page.)

*Primary Examiner*—Jean R. Homere
*Assistant Examiner*—Luke S Wassum
(74) *Attorney, Agent, or Firm*—Staas & Halsey LLP

(57) ABSTRACT

When a predetermined number of pieces of data are retrieved, a retrieving process is performed first on a local database 7 in a LAN 1, and a response counter 8 counts the number of pieces of response data accumulated in a response accumulation device 9. When it is determined that the predetermined number of pieces of response data cannot be obtained from the local database, a remote database 3 is searched by a retrieval device 6 through a communications device 2. Therefore, requests to search unnecessary databases can be reduced, and the load on a network and the remote database 3 can also be reduced successfully.

9 Claims, 17 Drawing Sheets

OTHER PUBLICATIONS

Lipton, R.J., Naughton, J.F., and Schneider, D.A. "Practical Selectivity Estimation through Adaptive Sampling". Proceedings of the 1990 ACM SIGMOD International Conference on Management of Data, May 23–26, 1990, pp. 1–11.*

Mannino, M.V., Chu, P., and Sager, T. "Statistical Profile Estimation in Database Systems", ACM Computing Surveys, vol. 20, No. 3, Sep. 1988, pp. 191–221.*

Walpole, R.E. and Myers, R.H. "Probability and Statistics for Engineers and Scientists, 2ed.", New York:MacMillan Publishing Company, 1978, pp. 158–166. TA340.W35 1978.*

Chen, C.M., and Roussopoulos, N. "Adaptive Selectivity Estimation Using Query Feedback", Proceedings of the 1994 ACM SIGMOD International Conference on Management of Data, May 1994, pp. 161–172.*

Lipton, R.J. et al. "Practical Selectivity Estimation through Adaptive Sampling", Proceedings of the 1990 ACM SIGMOD International Conference on Management of Data, May 23–26, 1990, pp. 1–11.*

* cited by examiner

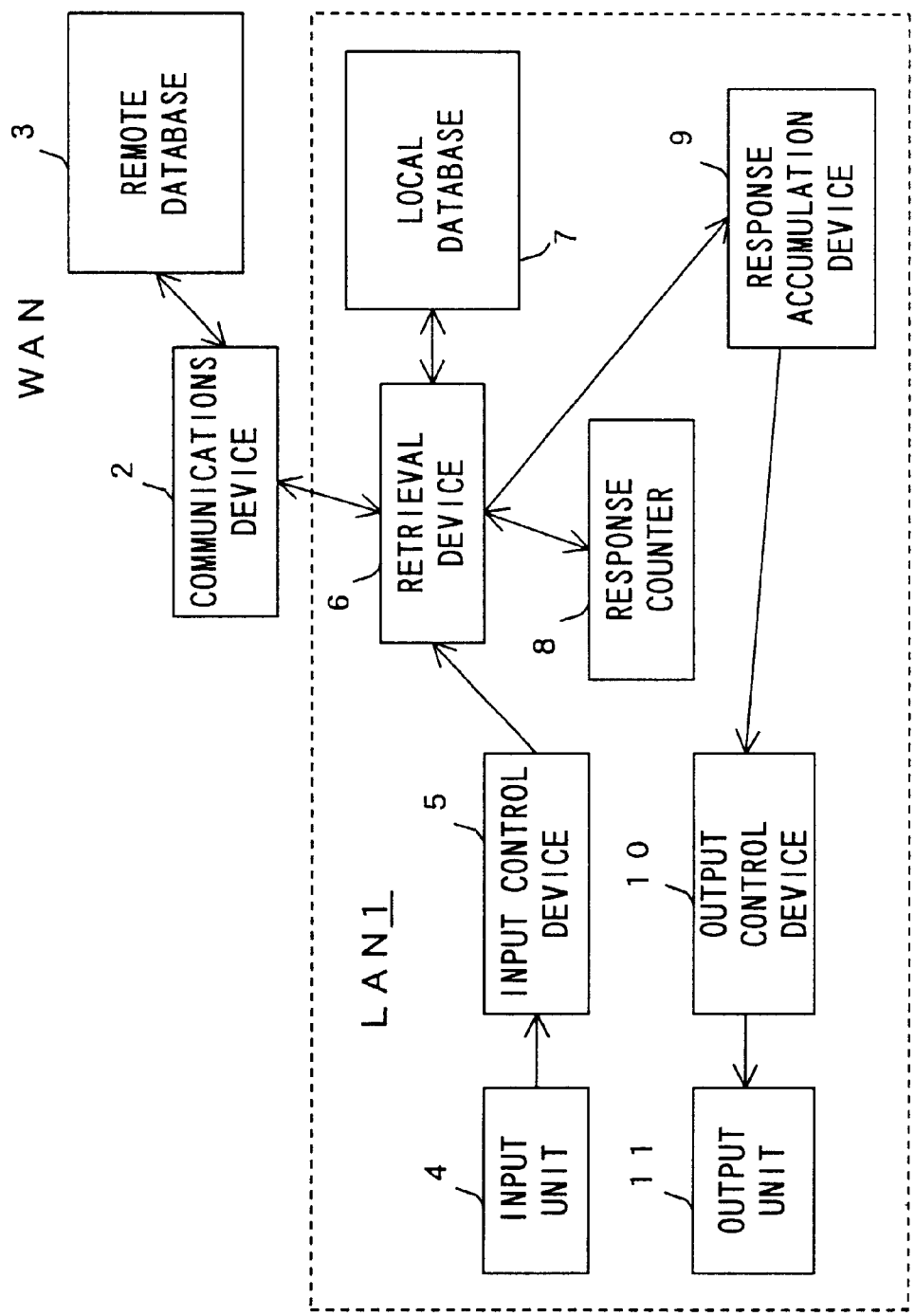
F I G. 1

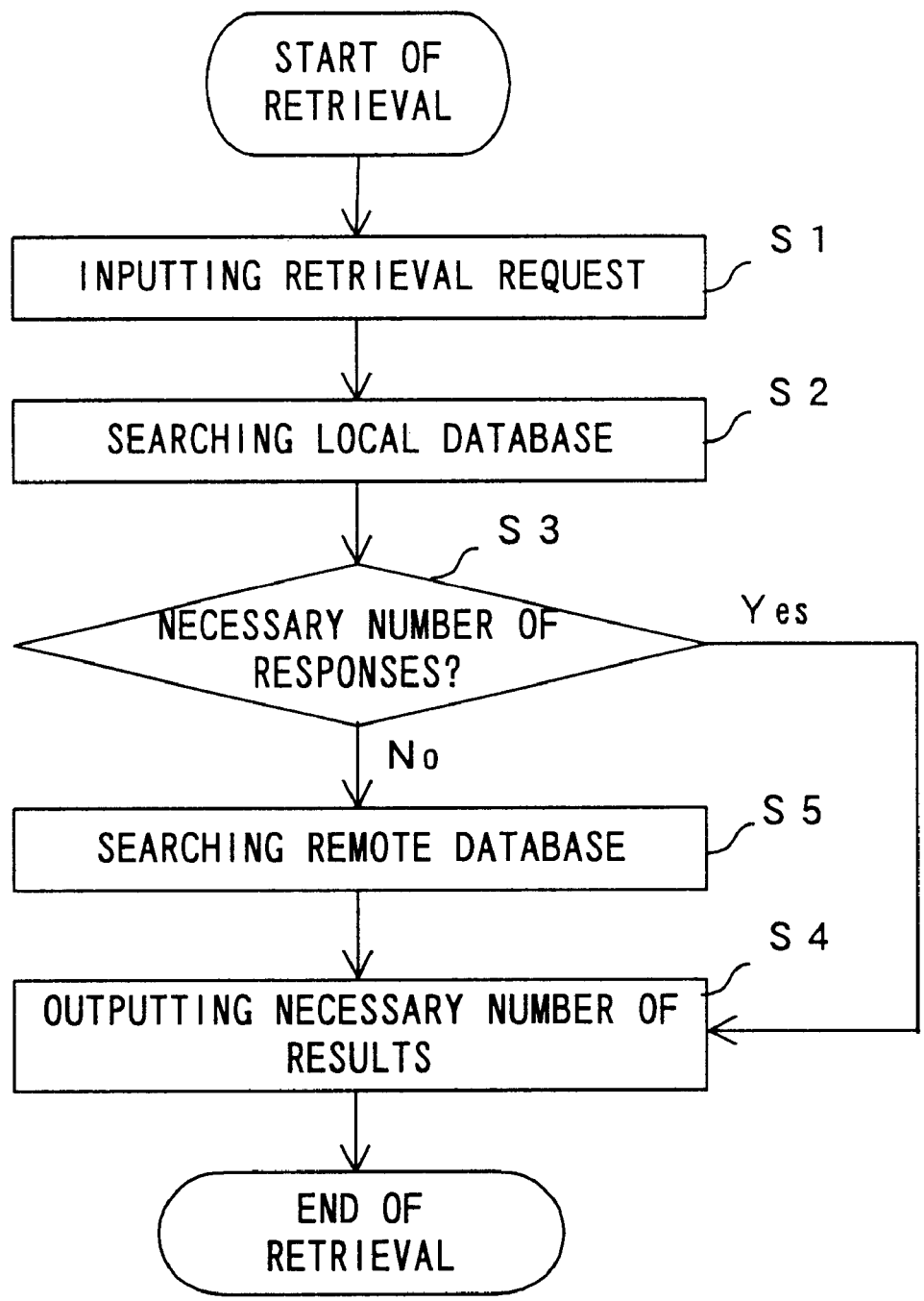
F I G. 2

| EVENT | CONTENTS OF CHANGE | NECESSARY NUMBER OF RESPONSES | RESPONSE COUNTER |
|---|---|---|---|
| ARRIVAL OF RETRIEVAL REQUEST | READING RETRIEVAL REQUEST, AND STARTING RETRIEVAL | 20 | 0 |
| COMPLETING SEARCH OF LOCAL DATABASE | RECORDING NUMBER OF RESPONSES IN RESPONSE COUNTER | 20 | 4 |
| DETERMINATION OF NUMBER OF RESPONSES | SINCE NUMBER OF RESPONSES IS SMALL, REQUEST TO SEARCH REMOTE DATABASE IS ISSUED | 20 | 4 |
| ALL RESPONSES OBTAINED FROM REMOTE DATABASE | OUTPUTTING NECESSARY NUMBER OF RESPONSES FROM RESPONSE ACCUMULATION DEVICE TO OUTPUT DEVICE | 20 | 40 |

FIG. 3

| REMOTE DATABASE | NUMBER OF PIECES OF ACCUMULATED DATA | DISTRIBUTING NUMBER OF REQUESTED RESPONSES |
|---|---|---|
| 3 a | 1,000,000 | 1 |
| 3 b | 3,000,000 | 3 |
| 3 c | 6,000,000 | 6 |
| TOTAL | | 10 |

F I G. 9

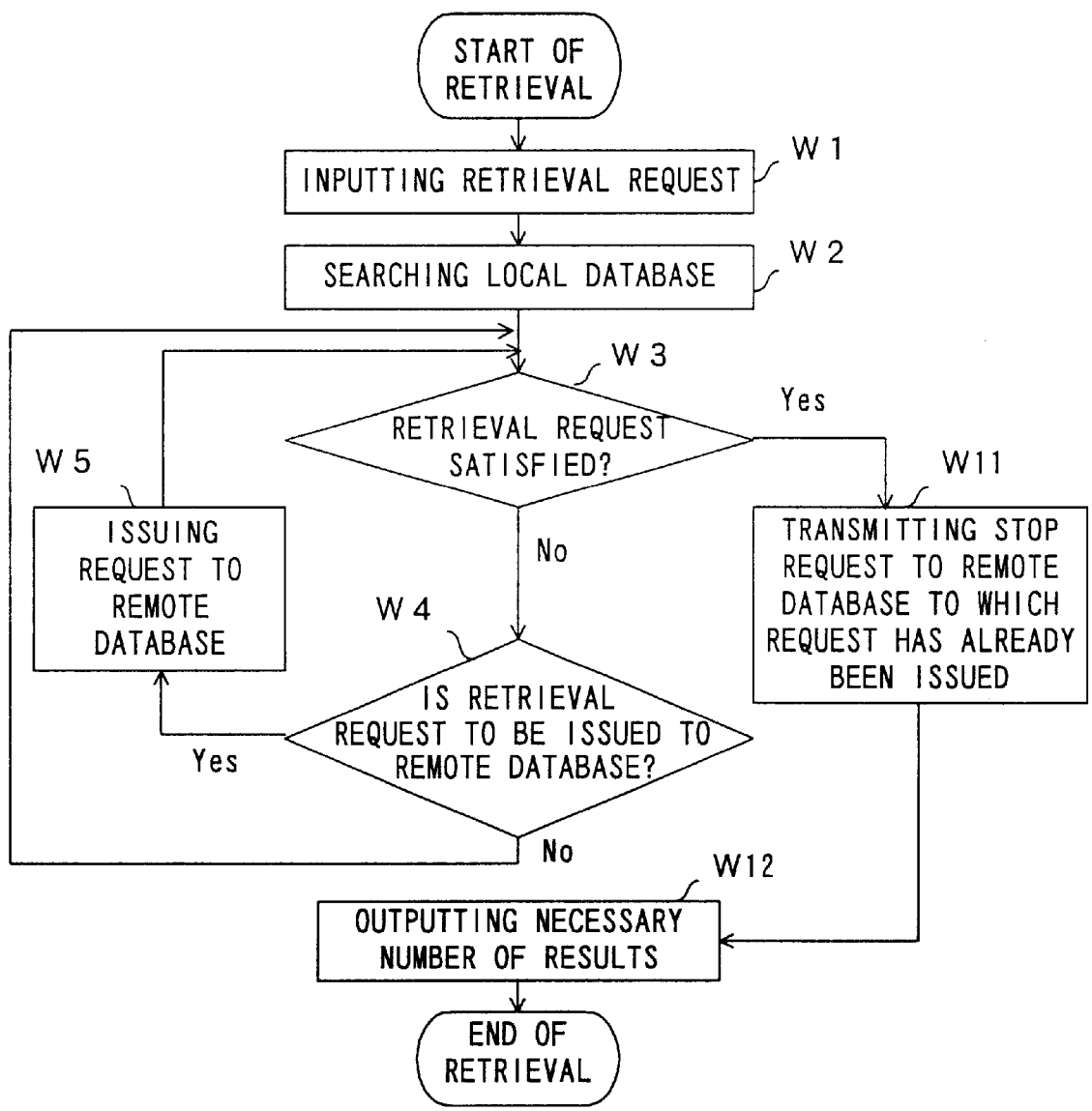
F I G. 11

| ELECTRONIC TEXT TYPE | FUNCTIONS OF ELECTRONIC TEXT | COMMUNICATIONS DIRECTION | PROCESSES |
|---|---|---|---|
| 1 | RETRIEVAL REQUEST | LOCAL → REMOTE | DATABASE RECEIVING THIS TEXT RETRIEVES DATA ACCORDING TO RETRIEVAL CONDITION IN ELECTRONIC TEXT, AND NOTIFIES REQUESTER OF RESULT NOTIFICATION IN ELECTRONIC TEXT TYPE 2. |
| 2 | NOTIFICATION OF RETRIEVAL RESULT | REMOTE → LOCAL | RETRIEVAL REQUESTER RECEIVES CONTENTS AS RESULT OF PREVIOUSLY ISSUED RETRIEVAL REQUEST. |
| 3 | STOP REQUEST | LOCAL → REMOTE | DATABASE RECEIVING THIS TEXT IMMEDIATELY TERMINATES RETRIEVAL STARTED IN CORRESPONDING ELECTRONIC DATA 1, AND RESULTS UP TO NOW ARE DISCARDED WITHOUT TRANSMISSION. |

31, 32, 33

F I G. 1 3

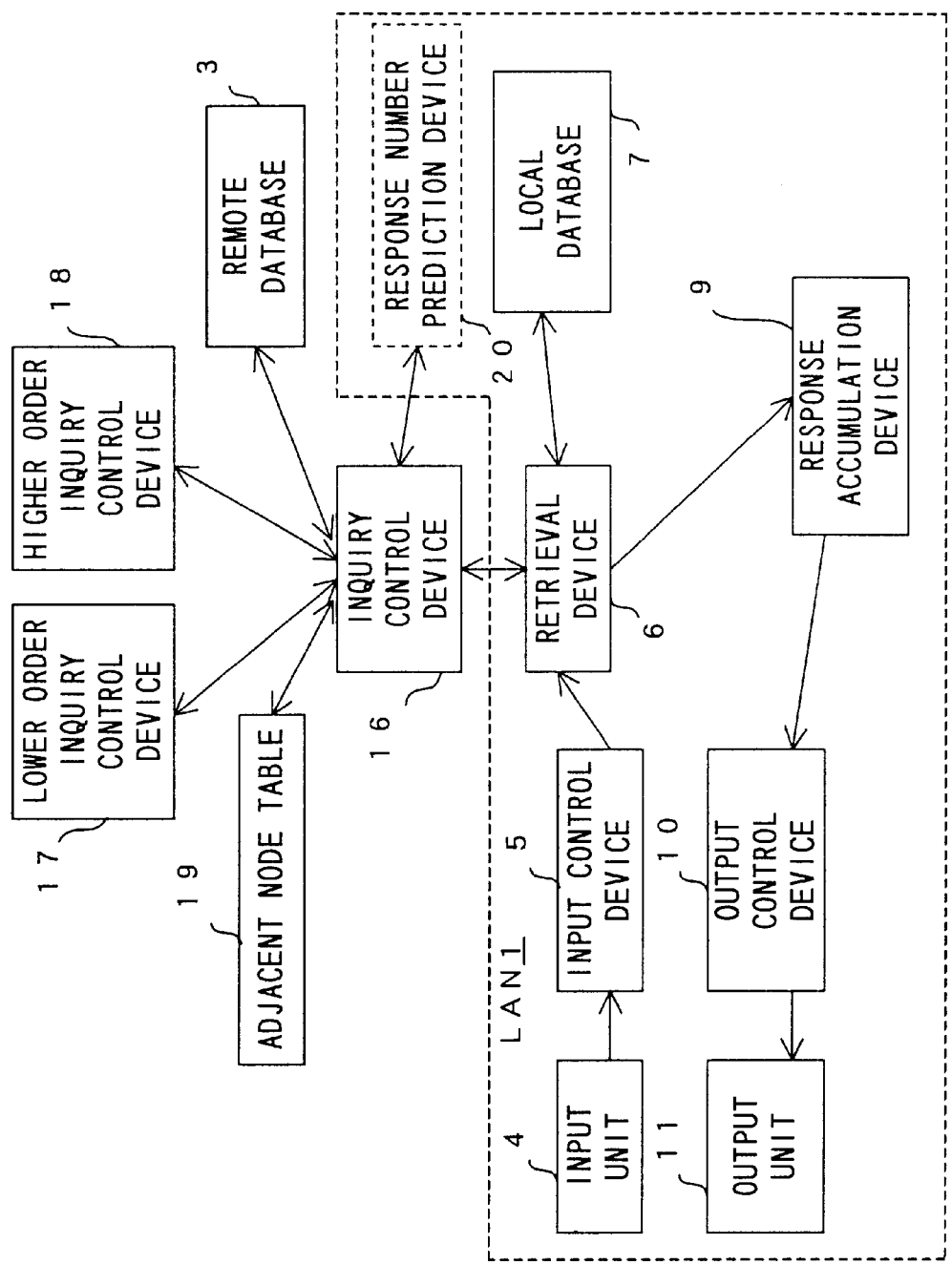
F I G. 1 4

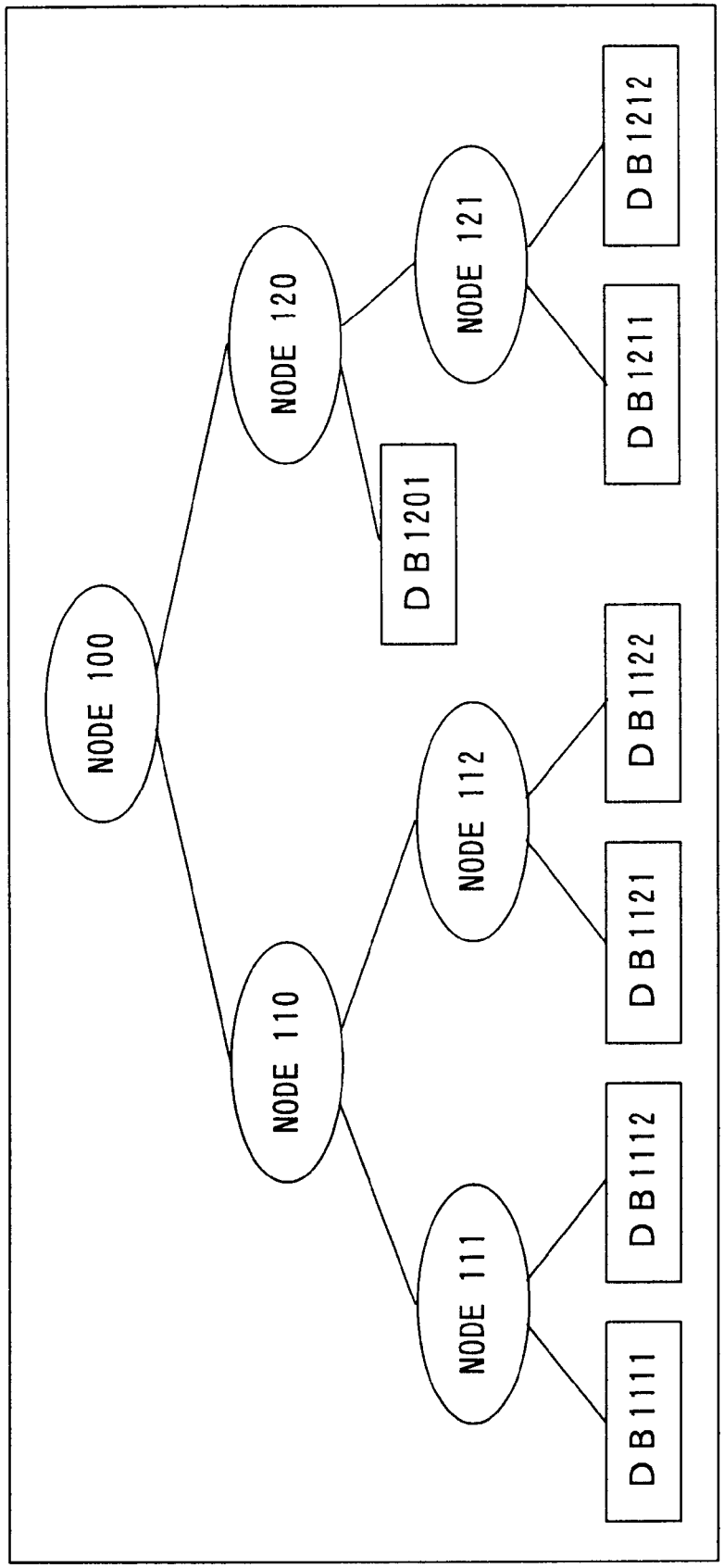
F I G. 1 5

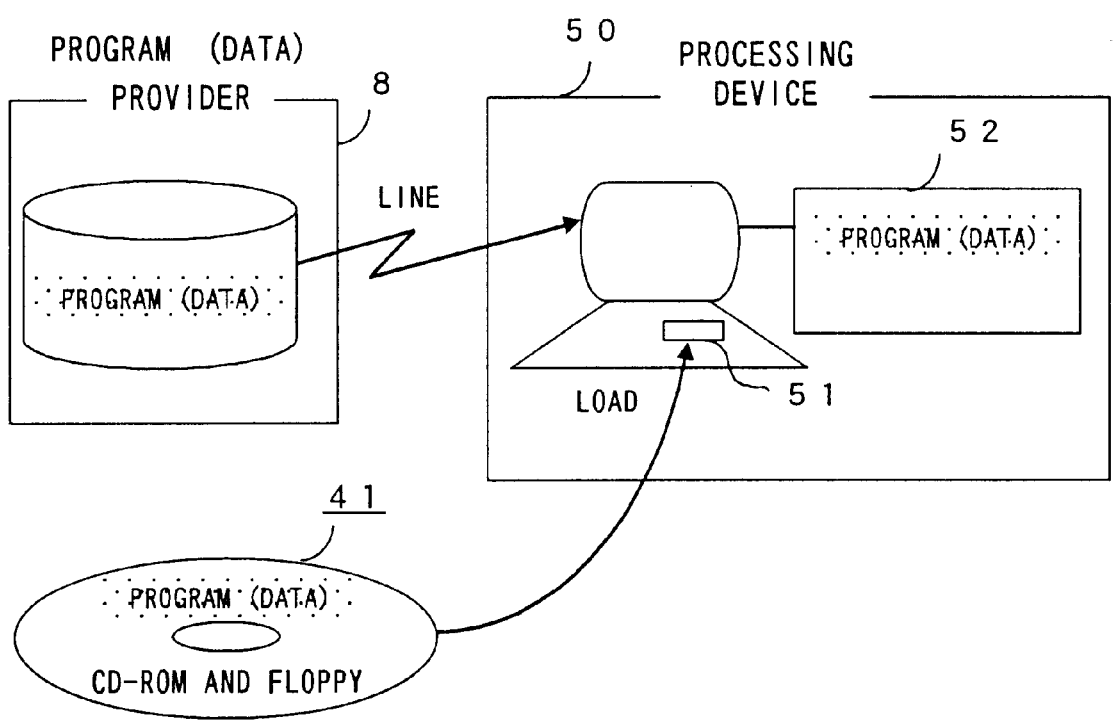
F I G. 1 7

DISTRIBUTED DATA RETRIEVAL SYSTEM INCLUDING MECHANISM FOR PREDICTING AN AMOUNT OF RESPONSE DATA

BACKGROUND OF THE INVENTION

1. Field of the Invention

The present invention relates to a data access apparatus and method for efficiently retrieving database resources distributed to a LAN (local area network) and a WAN (wide area network).

2. Description of the Prior Art

Recently, information retrieval systems with which a LAN is established within a company and connected to LANs established in other organizations such as companies, universities, research institutes, etc. through communications lines have been widely utilized to collect various information from a group of computer networks such as Internet, Intranet, Extranet, etc. A database accessed by such information retrieval systems is distributed through a network. For example, the database of a LAN of only one company (local database) is not sufficient in many cases. At this time, it is necessary to obtain information by accessing other databases (remote databases) through a communications line.

A conventional method for accessing such remote databases is the data access method and apparatus for accessing distributed databases as disclosed by Tokukai-hei 09-244939. This method associates each database with a remote database to set an access path, thereby reducing the concentration of the load onto a specific computer system in the inquiry process.

Another conventional system is the distributed system data referencing system as disclosed by Tokukai-hei 01-166247. According to this system, a retrieving process is performed on target data by searching the database site on which data is stored in order from the highest to the lowest in data access frequency when a remote database is searched.

There are the following problems with the above described conventional methods and apparatuses.

First, in the distributed database data accessing method and apparatus in Tokukai-hei 09-244939, the databases are searched in parallel. For example, since associated remote databases are accessed even if necessary data can be obtained from a local database, thereby charging the network and remote database with insignificant loads.

On the other hand, in the distributed system data referencing system according to Tokukai-hei 01-166247, a more frequently accessed database is retrieved by priority. It is not designed to retrieve a remote database through a network only when it is necessary to search remote databases. Therefore, since unnecessary database can be searched in the above described conventional system, thereby charging a network and a remote database with a large load.

SUMMARY OF THE INVENTION

The present invention aims at providing a method and an apparatus for reducing a load on a network and efficiently searching a database by decreasing access to unnecessary databases when a searching process is performed on a database having a high search evaluation.

That is, the above described aims according to the present invention can be attained by providing a data access apparatus for retrieving response data satisfying predetermined conditions based on a specific database in a distributed retrieval system in which a plurality of databases are distributed through a network. The data access apparatus includes: a retrieval unit for obtaining data satisfying the predetermined conditions as a response by retrieving the specific database; a count unit for counting the number of pieces of response data obtained by the retrieval unit searching the specific database; a retrieval request unit for requesting a search in another database in the network when the number of pieces of response data counted by the count unit does not reach a predetermined value; and a reception unit for receiving response data by searching the other database in response to the retrieval request from the retrieval request unit.

The specific database can be a local database directly connected to the computer to which a retrieval request is input, or a local database connected through, for example, an in-house LAN, etc. These databases can be accessed in a short time, and have a large volume of accumulated information related to the retrieval request. In addition, other databases in the network can be remote databases connected to other companies, research institutes, universities, etc. through Internet, public carriers, private lines, etc., require a longer access time, have a smaller volume of accumulated information, need a higher retrieval cost than the local database, and have lower evaluation orders.

As described above, the first aspect of the present invention has the configuration in which a retrieving process is performed on a specified database (local database) only, and issues a retrieval request to other databases (remote databases) through the retrieval request unit to supplement the insufficient number of pieces of response data when the number of response data does not reach a predetermined value.

Thus, the present invention has the configuration capable of reducing the load on a network and a remote database because no requests to search other databases are issued if the information obtained from the local database is enough.

Furthermore, the above described aims can be attained according to the second aspect of the present invention by providing a data access apparatus for retrieving response data satisfying predetermined conditions based on a specific database in a distributed retrieval system in which a plurality of databases are distributed through a network. The data access apparatus includes: a retrieval unit for obtaining data satisfying the predetermined conditions as a response by retrieving the specific database; a count unit for counting the number of pieces of response data obtained by the retrieval unit searching the specific database; a prediction unit for predicting the number of pieces of response data finally obtained as a result of searching the specific database according to the count information from the count unit and the information related to the specific database; and a retrieval request unit for requesting a search in another database in the network when the number of pieces of response data predicted by the prediction unit does not reach a predetermined value.

The second aspect of the present invention has the configuration in which insufficient response data can be supplemented from other databases by issuing a request to search other databases during the search in the local database if the predicted number of response data does not reach a predetermined value.

Thus, according to the second aspect of the present invention, the data retrieval time can be shortened by predicting the number of pieces of final response data obtained from a local database while reading data from the local database, and obtaining supplementary response data from a remote database when it is determined according to the prediction result that the necessary number of pieces of response data cannot be obtained.

In addition, the above described aims can be attained according to the second aspect of the present invention by providing a data access apparatus for retrieving response data satisfying predetermined conditions based on a specific database in a distributed retrieval system in which a plurality of databases are distributed through a network. The data access apparatus includes: a retrieval unit for obtaining data satisfying the predetermined conditions as a response by retrieving the specific database; a retrieval request unit for requesting an appropriate number of pieces of retrieved response data from another database when a request is issued to search the other database in the network: and a reception unit for receiving response data obtained as a result of searching the other database in response to the retrieval request from the retrieval request unit.

The retrieval request unit requests an appropriate number of pieces of retrieved response data from each database. The number of pieces of retrieved response data depends on, for example, the amount of accumulated data of each database, the retrieval speed for each database, a retrieval cost, etc.

With the above described configuration, data can be retrieved corresponding to the structure and the function of each database, thereby efficiently retrieving data.

Furthermore, when a predetermined number of pieces of response data is obtained during the data retrieval, a retrieval stop request is issued through a network to other databases (remote databases) being searched. By stopping searching other databases, an unnecessary retrieving process can be omitted, and a load on a network and other databases can be reduced.

In addition, according to a further aspect of the present invention, all databases including a specific database can be designed in a hierarchical structure, and a database closer to the specific database in the hierarchical structure is searched by priority so that the databases can be searched in order from the highest retrieval evaluation. Thus, a data access apparatus and method can be provided with high retrieval efficiency without issuing unnecessary inquiries.

BRIEF DESCRIPTION OF THE DRAWINGS

FIG. 1 shows the system configuration of the data access apparatus according to the first embodiment of the present invention;

FIG. 2 is a flowchart showing the first embodiment of the present invention;

FIG. 3 shows a practical example according to the first embodiment of the present invention;

FIG. 9 shows a practical example according to the third embodiment of the present invention;

FIG. 11 is a flowchart showing the fourth embodiment of the present invention;

FIG. 13 shows the practical contents of the electronic text types 1 through 3 according to the fourth embodiment of the present invention;

FIG. 14 shows the system configuration of the data access apparatus according to the fifth embodiment of the present invention;

FIG. 15 shows the hierarchical structure of the database used in the fifth embodiment of the present invention.

FIG. 17 shows the system configuration realized by the program containing a storage medium storing the data access method according to the present invention.

DESCRIPTION OF THE PREFERRED EMBODIMENT

Figure 4:
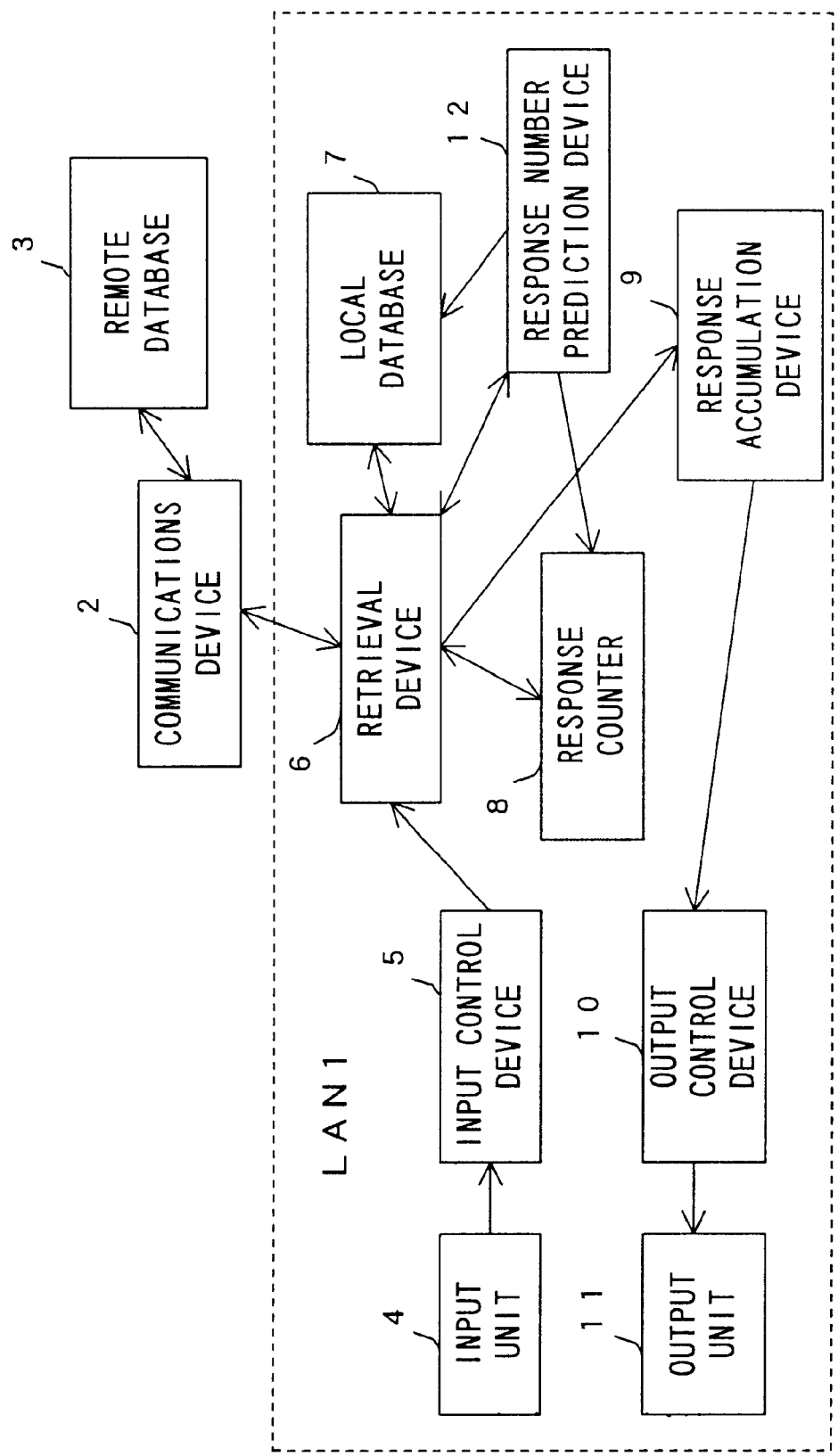
FIG. 4 shows the system configuration of the data access apparatus according to the second embodiment of the present invention.

The embodiments of the present invention are described below by referring to the attached drawings.

First Embodiment

FIG. 1 shows the system configuration of the data access apparatus according to the first embodiment of the present invention.

In FIG. 1, the system enclosed by dotted lines forms a LAN 1, and can be connected to another database (hereinafter referred to as a remote database) 3 in a WAN through a communications device 2. The LAN 1 comprises an input unit 4, an input control device 5, a retrieval device 6, a database (hereinafter referred to as a local database) 7, a response counter 8, a response accumulation device 9, an output control device 10, and an output unit 11.

The input unit 4 inputs a retrieval request containing a retrieval condition, etc., and can be a terminal device of a personal computer, a set top box, etc. The input control device 5 can be a server, etc. in the LAN 1, and outputs a retrieval request from the input unit 4 to the retrieval device 6.

The retrieval device 6 performs a process according to the flowchart described later, retrieves the local database 7 at the above described retrieval request, and also retrieves the remote database 3 through the communications device 2 as necessary.

The local database 7 is connected in the LAN 1, and there can be one or more databases. The response counter 8 counts the number of responses obtained as a result of a retrieving process performed by the retrieval device 6. The response accumulation device 9 accumulates the responses retrieved by the retrieval device 6. The number of responses accumulated by the response accumulation device 9 can be known by referring to the response counter 8 during the retrieving process.

The output control device 10 reads the response data accumulated by the response accumulation device 9, and outputs the data to the output unit 11. The output unit 11 can be, for example, a terminal device of a personal computer, etc., a display, a printer, etc., and outputs a response result as displayed images, printed characters, voice, etc. so that the user can confirm the result.

Next, the retrieving process according to the present embodiment is described below by referring to the flowchart shown in FIG. 2.

First, a retrieval request is input to the retrieval device 6 from the input unit 4 through the input control device 5 (step (hereinafter expressed by S) 1). When the retrieval request is input, the retrieval device 6 interprets the retrieval condition contained in the retrieval request, and searches the local database 7 based on the retrieval condition (S2). At this time, if a plurality of local databases 7 are contained in the LAN 1, the retrieval device 6 selects a local database 7 satisfying the condition, and performs a retrieving process on the local database 7.

As a result of the retrieving process, data satisfying the retrieval condition is read from the local database 7 as a response. Then, the read responses are sequentially written to the response accumulation device 9. During the process, the response counter 8 counts the responses accumulated by the response accumulation device 9.

Assuming that the number of pieces of necessary data (necessary number of responses) is 20, the retrieval device 6 continues the retrieving process by referring to the response counter 8. If the retrieval device 6 receives the necessary number (20) of responses from the local database 7 (YES in S3), then it outputs the number to the output unit 11 through the output control device 10 (S4).

FIG. 3 shows an example of the practical process according to the present embodiment. If a retrieval request has been issued and the necessary number of responses is 20 as described above, then the initial value of the response counter 8 is 0. Then, if the retrieving process is performed on the local database 7, the retrieving process is completed on the local database 7, and four responses are written to the response accumulation device 9, then the count value of the response counter 8 is 4. In this case, the value does not reach the necessary number of responses (NO in S3).

Therefore, at this time, the retrieval device 6 issues a retrieval request to the remote database 3 through the communications device 2 to access other databases (S5). The retrieval request can be issued to the remote database 3 by determining an appropriate retrieval transfer protocol.

In response to the above described request, the remote database 3 retrieves data satisfying the retrieval condition. If the remote database 3 obtains the data, it transmits the data as a response to the retrieval device 6 through the communications device 2. As a result, the response is accumulated in the response accumulation device 9, and the count value of the response counter 8 is incremented by 1. When the retrieval device 6 receives all responses from the remote database 3, it instructs the response accumulation device 9 to output to the output unit 11 the necessary number of responses out of the responses accumulated in the response accumulation device 9.

In the example shown in FIG. 3, 40 responses are accumulated in the response accumulation device 9, and 20 responses are output from the response accumulation device 9 to the output unit 11.

As described above, when a retrieval request is issued in the present embodiment, the local database 7 in the LAN 1 to which the current retrieval device 6 belongs is processed as a retrieval target. Only when the necessary number of responses cannot be obtained from the local database 7, another database (remote database 3) is searched to obtain the necessary number of responses. With the configuration, when the responses obtained from the local database 7 are enough to reach the required number of responses, a retrieval request is not issued to the remote database 3, thereby reducing the load on the network and remote database.

According to the present embodiment, if the accumulation of the responses in the response accumulation device 9 is limited to the necessary number of responses and excess responses are not accumulated but discarded, then there is no need to reserve a large accumulation capacity for the response accumulation device 9 in response to a retrieval request, thereby efficiently utilizing the memory.

In addition, in the protocol for transferring a retrieval request to the above described remote database 3, adding the function of detecting a communications error in the network or a process error on the remote database 3, the process can be prevented from being stopped in the wait state for a response from the remote database 3.

Second Embodiment

Described below is the second embodiment of the present invention.

The present embodiment is different from the first embodiment in its response number prediction device. That is, according to the present embodiment, if the final number of responses is predicted when data is read from the local database, and it is determined that the necessary number of responses cannot be obtained, then the process of searching a remote database starts, thereby increasing the process speed of the data retrieval.

FIG. 4 shows the system configuration of the data access apparatus according to the second embodiment of the present invention. As described above, the present embodiment has the configuration in which a response number prediction device 12 is added to the configuration according to the first embodiment. Therefore, in FIG. 4, the components also shown in FIG. 1 are assigned the same unit numbers as those shown in FIG. 1, and the description of the configuration is omitted here.

The data access apparatus according to the present embodiment comprises an input unit 4 in a LAN 1 enclosed by dotted lines, an input control device 5, a retrieval device 6, a local database 7, a response counter 8, a response accumulation device 9, an output control device 10, an output unit 11, and a response number prediction device 12. The retrieval device 6 retrieves necessary information from the remote database 3 through the communications device 2. The response number prediction device 12 is connected to the above described retrieval device 6, the local database 7, and the response counter 8, and predicts the number of responses obtained from the local database 7 based on the information, etc. about the retrieval state of the local database 7 the number of responses counted by the response counter 8 during the retrieving process performed by the retrieval device 6.

Figure 5:
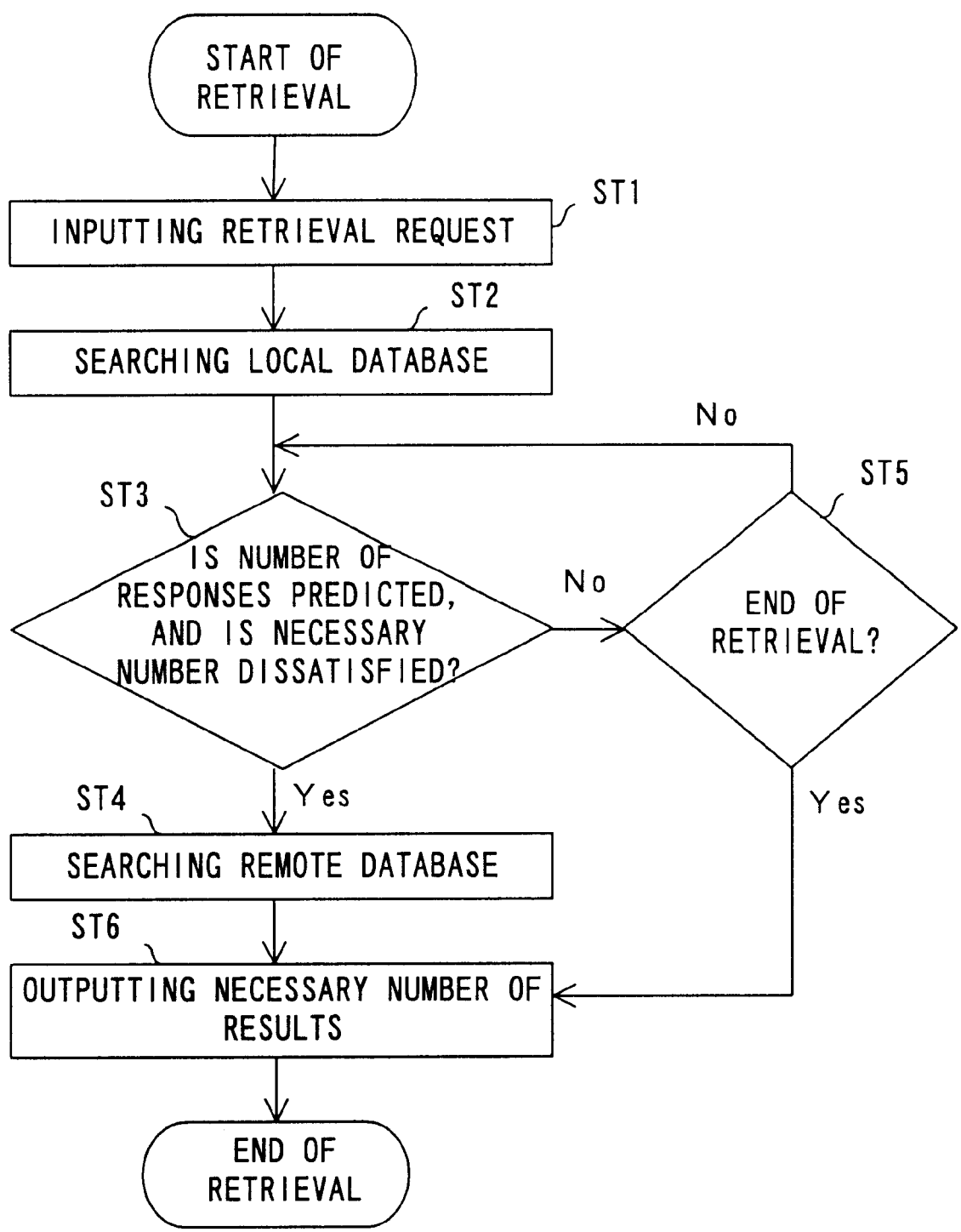
FIG. 5 is a flowchart showing the second embodiment of the present invention.

The retrieving process performed according to the present embodiment is concretely described below by referring to the flowchart shown in FIG. 5. First, as in the above described first embodiment, when a retrieval request is input from the input unit 4 (step (hereinafter expressed by ST) 1), the local database 7 is searched (ST2), data satisfying the retrieval condition is read from the local database 7, and is accumulated in the response accumulation device 9. The response counter 8 counts the number of responses accumulated in the response accumulation device 9.

The response number prediction device 12 predicts the number of responses obtained at the completion of data retrieval from the local database 7 based on the information, etc. about the retrieval state of the local database 7 the number of responses counted by the response counter 8 during the retrieving process performed by the retrieval device 6. If the response number prediction device 12 determines that the number responses can be predicted and does not reach the necessary number of responses (YES in ST3), then it issues a request to search the remote database 3 (ST4). On the other hand, if it determines that the necessary number of responses can be obtained at the completion of the data retrieval from the local database 7 (NO in ST3), then the process of searching the local database 7 continues (NO in ST3, ST5).

Described below is an example of the predicting process performed by the response number prediction device 12. As described above, the response number prediction device 12 confirms the retrieval state from the local database 7 and the count value of the response counter 8, reads the information about the number L of records to be retrieved and the number L' of retrieved records from the local database 7, reads the count value of the number S of retrieved responses from the response counter 8, and computes the predicted number P of responses based on the prediction function expressed by the following equation (1).

$$\text{predicted number } (P) \text{ of responses} = \text{number } S \text{ of retrieved responses} \times \text{number } L \text{ of records to be retrieved}/\text{number } L' \text{ of retrieved records.} \quad (1)$$

For example, if the number S of retrieved responses is 5, the number L of records to be retrieved is 10,000, the number L' of retrieved records is 1,000 at a point during the process of searching the local database 7, then the predicted number (P) of responses=5×10,000/1,000, and the predicted number (P) of responses is 50.

The possibility that the necessary number of responses can be obtained at the completion of the retrieval from the local database 7 being searched can be predicted by comparing the predicted number (P) of responses with a predetermined necessary number of responses. For example, if the necessary number of responses is 60, then it is determined that the necessary number of responses cannot be obtained at the completion of the retrieval (YES in ST3), and a request to search the remote database 3 is issued. (ST4).

On the other hand, if the necessary number of responses is 40, it is determined that the necessary number of responses can be obtained at the completion of the retrieval (NO in ST3), and the process of searching the local database 7 continues (NO in ST3, ST5). The response number prediction device 12 repeatedly performs the above described predicting process at predetermined intervals while the retrieval device 6 searches the local database 7. If the response number prediction device 12 determines, as a result of the predicting process performed by the above described equation (1), that the necessary number of responses cannot be obtained when the process of searching the local database 7 is completed (YES in ST3), then it issues a request to search the remote database 3 (ST4). When the process of searching the local database 7 is completed without issuing a request to search the remote database 3 (YES in ST5), the responses accumulated in the response accumulation device 9 are output to the output unit 11 (ST6), thereby terminating the process.

When a request to search the remote database 3 is output, the retrieval device 6 requests to search the remote database 3 through the communications device 2, accumulates the responses transmitted from the remote database 3 in the response accumulation device 9 as in the above described first embodiment, and counts the number of responses accumulated in the response accumulation device 9. Then, necessary responses are output to the output unit 11 depending on the number of responses accumulated in the response accumulation device 9.

As described above, according to the present embodiment, the final number of responses obtained from the local database 7 is predicted while the records in the local database 7 are retrieved. As a result of the prediction, if it is determined that the necessary number of responses cannot be obtained from the local database 7, then it begins searching the remote database 3. Therefore, a request to search the remote database 3 can be issued at an early stage, thereby shortening the total retrieval time.

The method of performing a predicting process by the response number prediction device 12 is not limited to the above described example, but the final number of responses obtained from the local database 7 can be predicted using the retrieval time as a parameter when the time required to retrieve data from the entire local database 7 can be figured out.

In addition, the predicted function used in computing the predicted number of responses is not limited to the above described example, but can be a nonlinear function using the bias characteristic of the data in the local database 7. Furthermore, the computation of the predicted number of responses can be performed, at any other time than the initial stage of the retrieving process, depending on the prediction characteristic so that higher computation precision can be attained.

Third Embodiment

Described below is the third embodiment of the present invention.

As compared with the first and second embodiments, the present embodiment requests different numbers of retrieved responses when retrieval requests are transmitted to respective remote databases, and reduces the number of responses obtained from each database using a prediction function down to a predetermined number.

That is, when a response is obtained from an accessed remote database according to the present embodiment, the number of responses obtained from each remote database is not always the same number, but can be different depending on the configuration of each remote database to perform a data retrieving process with the load on a remote database and a network reduced. In addition, using a prediction function, a more efficient data retrieving process can be performed from remote databases.

Figure 6:
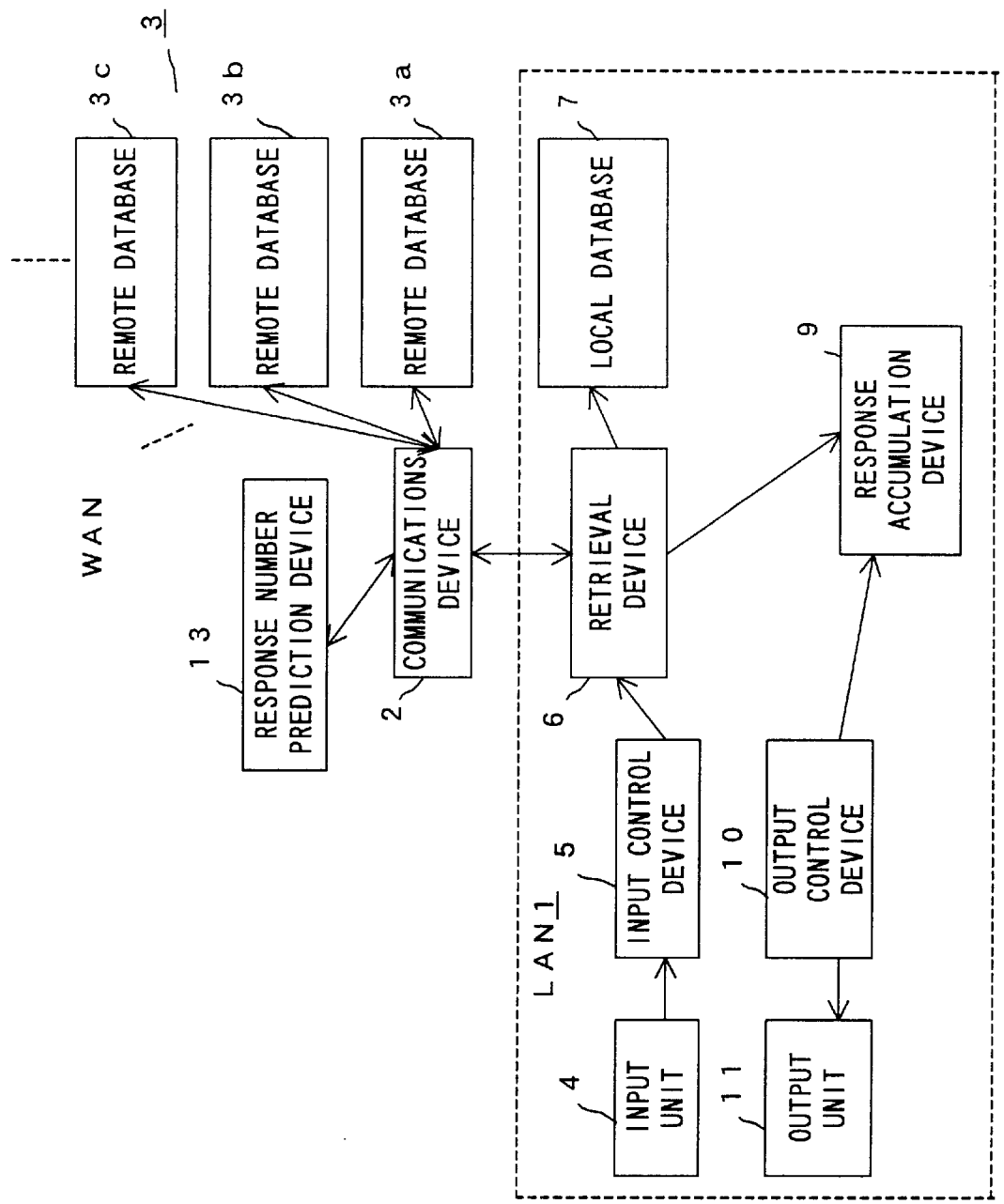
FIG. 6 shows the system configuration of the data access apparatus according to the third embodiment of the present invention.

FIG. 6 shows the system configuration of the data access apparatus according to the present embodiment. As described above, the present embodiment has the configuration in which a response number prediction device 13 is added to the configuration according to the second embodiment. Therefore, in FIG. 6, the components also shown in FIG. 1 are assigned the same unit numbers as those shown in FIG. 1, and the description of the configuration is omitted here.

The data access apparatus according to the present embodiment comprises an input unit 4 in a LAN 1 enclosed by dotted lines, an input control device 5, a retrieval device 6, a local database 7, a response accumulation device 9, an output control device 10, and an output unit 11. The retrieval device 6 retrieves necessary information from the remote database 3 through the communications device 2. The above described response counter 8, and the response number prediction device 12 for the local database 7 used in the second embodiment is omitted in FIG. 6.

There are a plurality of remote databases 3 connected to the communications device 2 according to the present embodiment. For example, they are expressed as remote databases 3*a*, 3*b*, 3*c*, . . . 3*n*. In addition, the response number prediction device 13 adjusts the number of responses read from each of the remote databases 3*a*, 3*b*, 3*c*, . . . , 3*n* using a prediction function.

Figure 7:
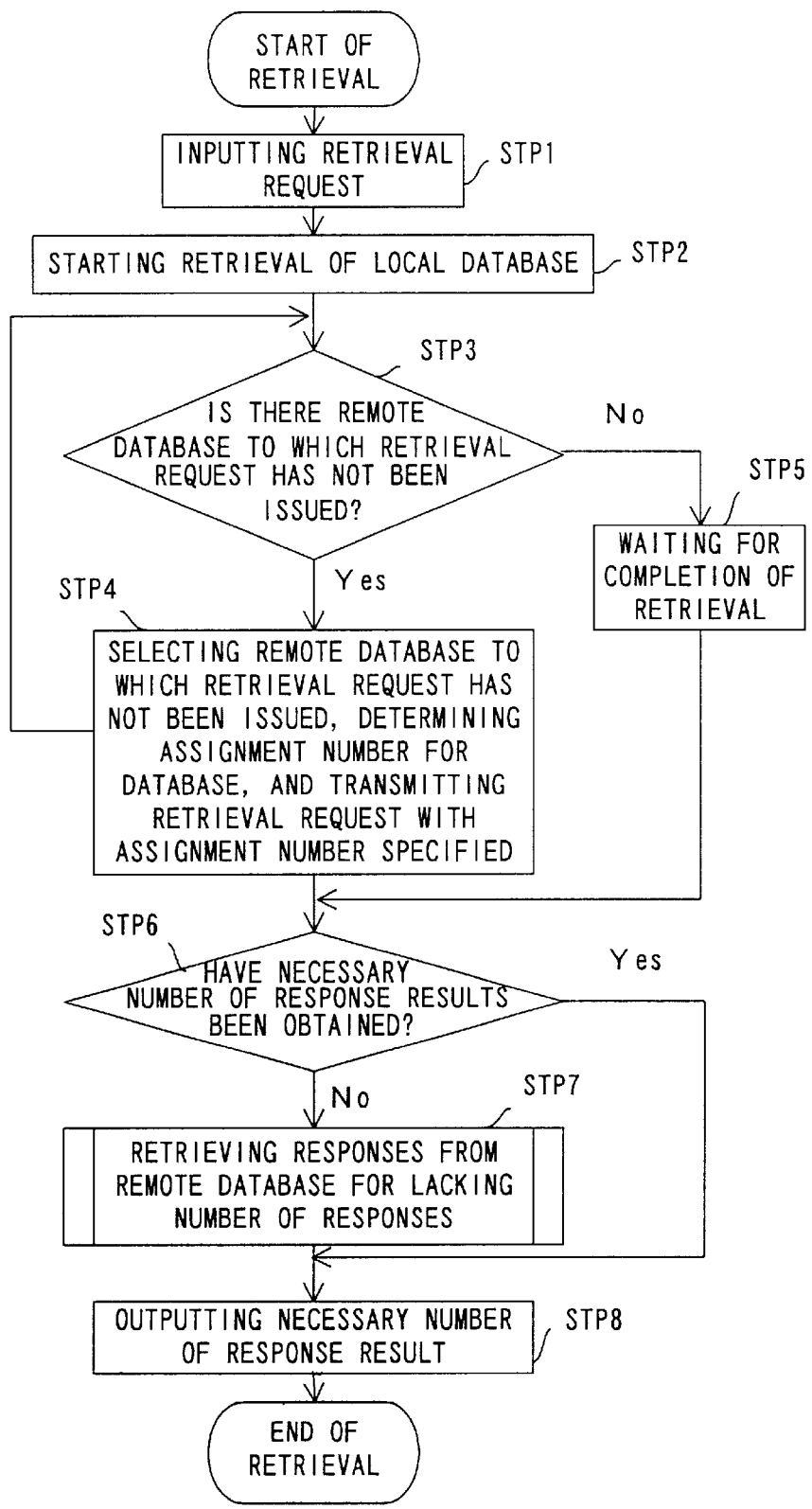
FIG. 7 is a flowchart showing the third embodiment of the present invention.
Figure 8:
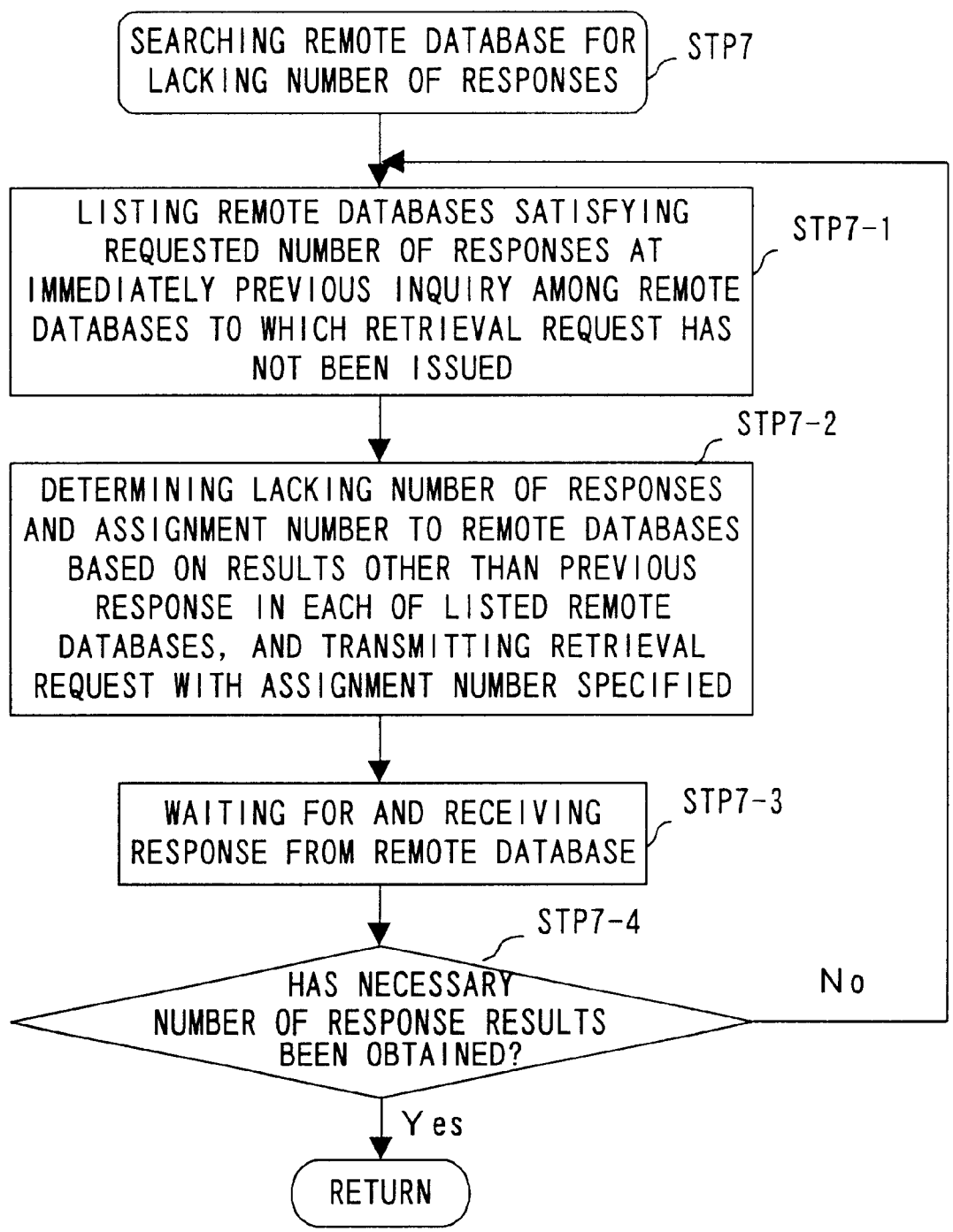
FIG. 8 is a flowchart showing the third embodiment of the present invention.

The retrieving process according to the present embodiment is described by referring to the flowcharts shown in FIGS. 7 and 8. First, in the flowchart shown in FIG. 7, when a retrieval request is input from the input unit 4 (step (hereinafter expressed by STP) 1), the retrieval device 6 first searches the local database 7 (STP2), reads data satisfying the retrieval condition from the local database 7, and accumulates the data in the response accumulation device 9. On the other hand, the retrieval device 6 requests to search the communications device 2, and receives the data satisfying the retrieval condition from the remote databases 3*a*, 3*b*, 3*c*, . . . , 3*n* through a network.

At this time, the output from the retrieval device 6 is a retrieval request to the communications device 2, but the communications device 2 requests the number of responses depending on the configuration of each of the remote databases 3*a*, 3*b*, 3*c*, . . . , 3*n* through the above described response number prediction device 13. FIG. 9 shows a practical example. For instance, there are three remote databases 3 (3*a*, 3*b*, and 3*c*) in the example shown in FIG. 9, and a different number of requested responses is set for each of the remote databases 3*a*, 3*b*, and 3*c*. For example, as shown in FIG. 9, when the number of requested responses is ten, the number of responses at a retrieval request is proportionally distributed depending on the number of pieces of accumulated data in each remote database. For example, one (1) response at a retrieval request is distributed to the remote database 3*a* corresponding to the number of pieces of accumulated data of 1,000,00. Three (3) responses at a retrieval request are distributed to the remote database 3*b* corresponding to the number of pieces of accumulated data of 3,000,000. Six (6) responses at a retrieval request are distributed to the remote database 3*c* corresponding to the number of pieces of accumulated data of 6,000,000.

As described above, the number of responses at a retrieval request is set for each of the remote databases 3*a*, 3*b*, 3*c*, . . . , 3*n* through the response number prediction device 13, and a retrieval request is issued for each remote database.

The output of the above described retrieval request is issued to the selected remote database 3 by sequentially selecting the remote databases 3 one by one as shown in the flowchart shown in FIG. 7 until it is determined that there are no remote databases 3 to which a data retrieval request has not been issued exist (YES in STP3, STP4).

Then, when a retrieval request is issued to all remote databases 3 (NO in STP3), a retrieval completion notification is waited for by all remote databases 3 (STP5).

That is, the retrieval device 6 determines whether or not the necessary number of responses are obtained (STP6). Then, while the necessary number of responses are not obtained (NO in STP6), the process of searching the remote database continues for the lacking number of responses (STP7).

FIG. 8 is a flowchart of the process (STP7). Practically, a database which has satisfied the requested number of responses in the previous inquiry is listed from among the remote databases 3 to which a retrieval request has not been issued (STP7-1). Then, the lacking number of responses and the assigned number to each remote database 3 are determined for each of the listed remote databases 3 with the results other than the previous response taken into account, and the assigned number is specified for each remote database 3, thus transmitting a retrieval request (STP7-2). Next, a response from the remote database 3 to which the retrieval request has been transmitted is waited for, and the response result is received (STP7-3). Then, it is determined whether or not the necessary number of response results have been obtained (STP7-4).

If it is determined that the necessary number of responses have not been received (NO in STP7-4), control is returned to STP7-1, and the above described processes are repeated. Thus, by repeatedly performing the above described processes (STP7-1, 7-2, 7-3, and 7-4), the finally necessary number of responses are obtained (YES in STP7-4, YES in STP6), and the necessary number of responses can be transmitted from the remote database 3 to the retrieval device 6 (STP8).

After performing the above described processes, the response accumulation device 9 accumulates the necessary number of responses of retrieved data, and then the data accumulated in the response accumulation device 9 is output to the output unit 11.

As described above, when a response is obtained by accessing the remote database 3 according to the present embodiment, the response number prediction device 13 changes a retrieved response request for each remote database 3 based on the accumulated data, etc. of each remote database 3, thereby efficiently retrieving data within a short time. In the process according to the present embodiment, the necessary number of responses for the remote database 3 is reduced, and the load on the network and the remote database 3 can also be reduced.

In addition, according to the present embodiment, as shown in the above described process (STP7-1 through 7-4), a retrieval request is transmitted again to a remote database 3 as necessary, and a method of increasing the number of requested responses, etc. as necessary can be used, and a predetermined number of pieces of response data can be obtained without fail.

The above described distribution can be set not only as a proportional distribution simply depending on the number of pieces of accumulated data in the remote database 3, but also as an increase taken into account to the total number of requested responses from the remote database 3 with the lacking number of responses involved. Furthermore, in consideration of the cost for searching each remote database 3, the assigned number for each remote database 3 can be adjusted, and the process speed for each remote database 3 is considered, thereby following the method of adjusting the assigned number for each remote database 3 so that a more efficient and quick data retrieving process can be performed.

Furthermore, in the above described distribution, the assigned number can be set for each remote database 3 based on the previous response results. In this case, when the user specifies the category of retrieval (for example, law, computer, politics, health, etc.), the assigned number can be set for a previous response result in consideration of the corresponding category only. Thus, an appropriate distribution can be realized and a more efficient data retrieval can be performed.

Fourth Embodiment

Described below is the fourth embodiment of the present invention.

According to the present embodiment, after a process of searching each remote database has been started, and the necessary number of responses can be obtained, the process of searching the remote database can be completed at an early stage with the load on a network reduced, thereby avoiding an unnecessary retrieving process.

Figure 10:
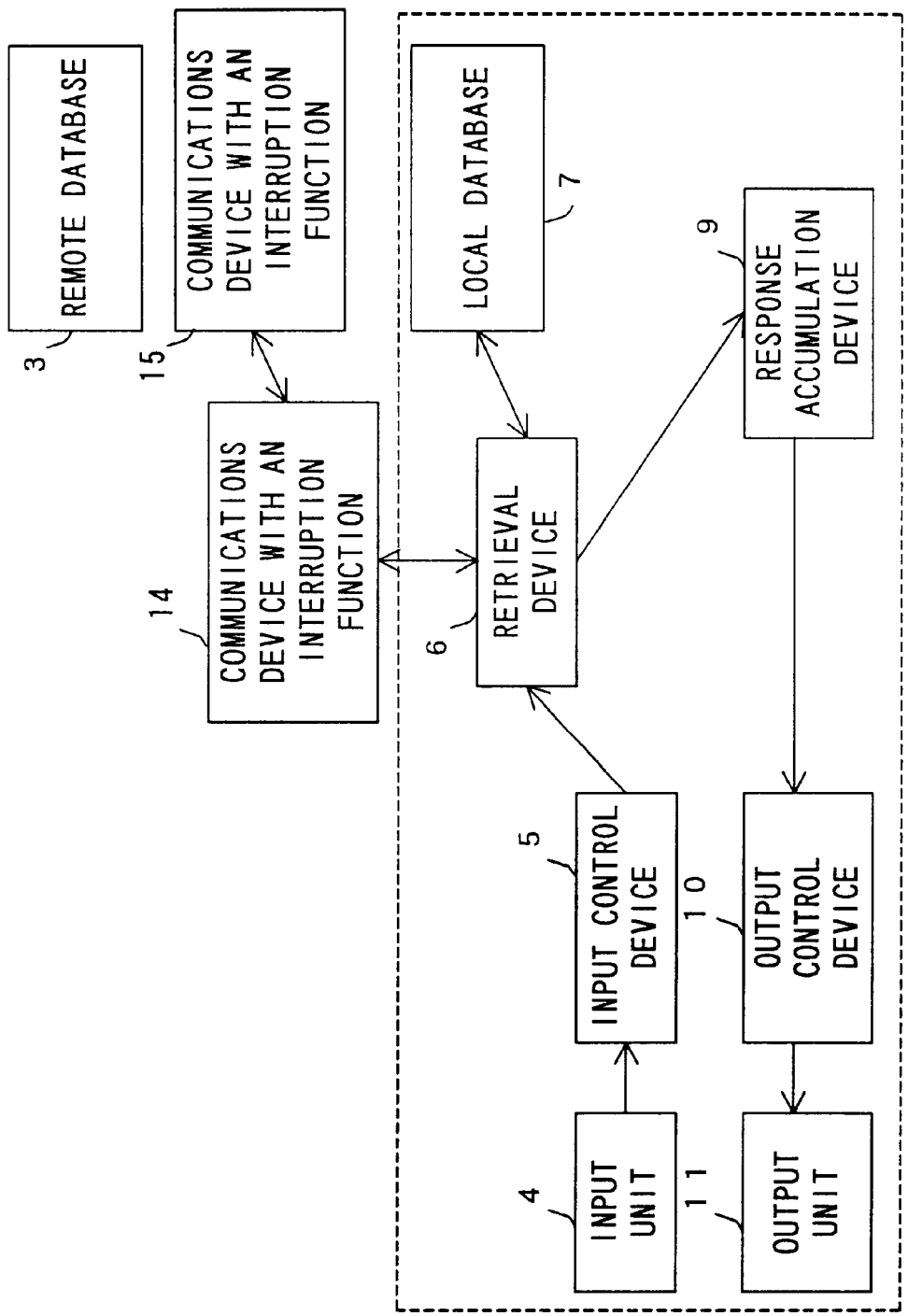
FIG. 10 shows the system configuration of the data access apparatus according to the fourth embodiment of the present invention.

FIG. 10 shows the system configuration of the data access apparatus according to the present embodiment. In the present embodiment, the communications device 2 is replaced with the communications devices 14 and 15 with an interruption function. Otherwise, the configuration is basically the same as that of the first embodiment.

In FIG. 10, the data access apparatus according to the present embodiment comprises an input unit 4, an input control device 5, a retrieval device 6, a local database 7, a response accumulation device 9, an output control device 10, and an output unit 11 in the LAN 1 enclosed by dotted lines. The retrieval device 6 is connected to the remote database 3 through the communications devices 14 and 15 with an interruption function. In FIG. 10, a plurality of remote databases 3 are connected to a network. The response counter 8 is omitted in the present embodiment.

The communications devices 14 and 15 with an interruption function are respectively provided for the local database 7 and the remote database 3, and are used when a retrieval request and a retrieval stop request are transmitted from the retrieval device 6 to the remote database 3, or when a retrieval result notification is transmitted from the remote database 3 to the retrieval device 6.

Figure 12:
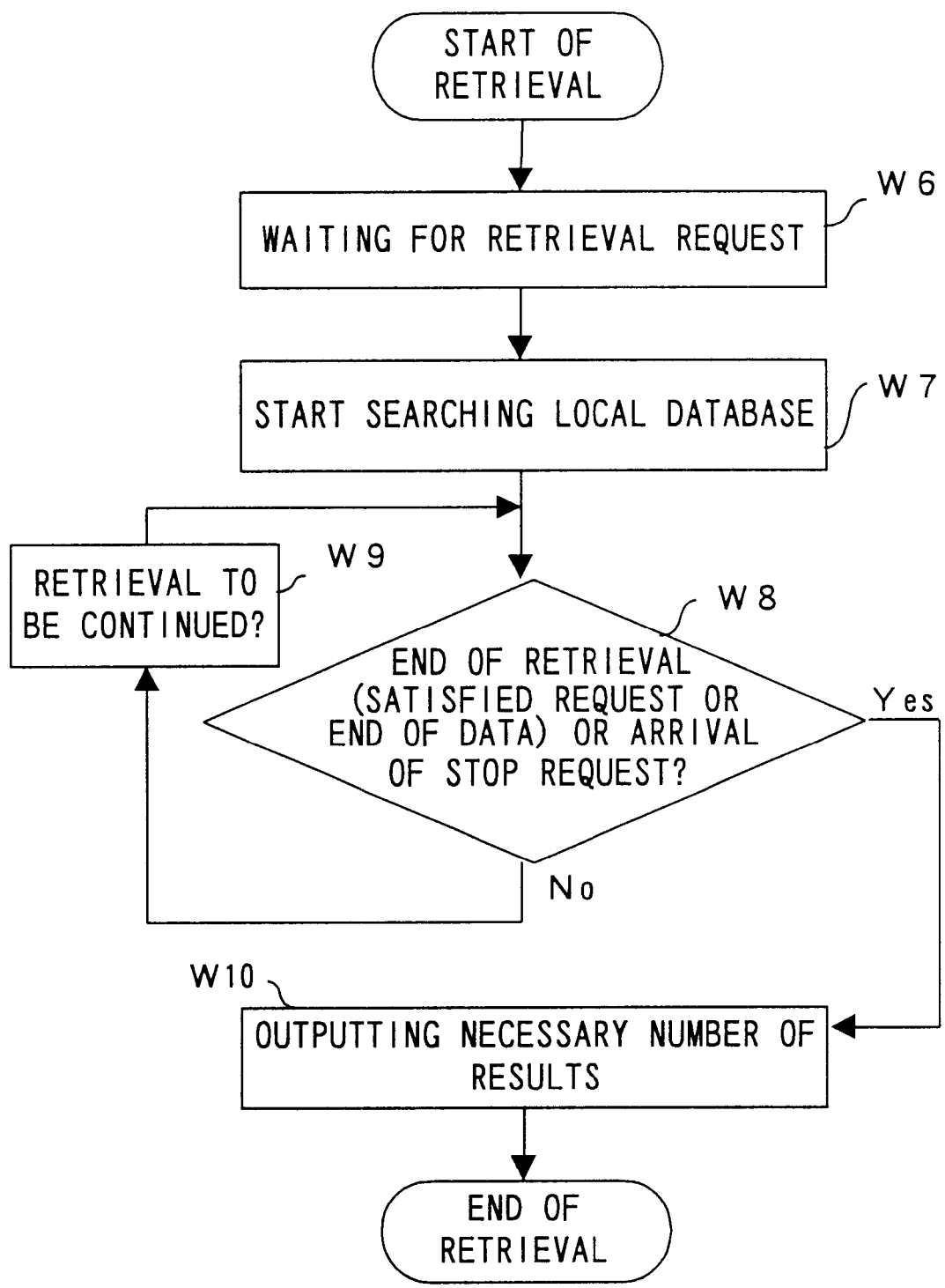
FIG. 12 is a flowchart showing the fourth embodiment of the present invention.

The retrieving process according to the present embodiment is described by referring to the flowcharts shown in FIGS. 11 and 12. First, in the flowchart shown in FIG. 11, when a retrieval request is input from the input unit 4 as in the above described embodiment (step (hereinafter expressed by W) 1), the local database 7 is first searched (W2), a response satisfying the retrieval condition is read from the local database 7, and the result is accumulated in the response accumulation device 9.

The retrieving process terminates when the retrieving process continues on the local database 7, and a predetermined number of responses are obtained. However, in the present embodiment, the remote database 3 can also be searched, and the retrieval request is not satisfied by searching the local database 7 only (NO in W3). Therefore, the retrieval device 6 determines whether or not a request to search the remote database 3 is required (W4), and the determination is repeated (W3, W4) until, for example, the retrieval request is satisfied (YES in W3). If it is determined that a request to search the remote database 3 is required (YES in W4), then the retrieval device 6 requests to search the remote database 3 through the communications devices 14 and 15 with an interruption function (W5).

The electronic text type 1 shown in FIG. 13 refers to an electronic text 31 of a retrieval request. The retrieval device 6 transmits the electronic text to the communications device 14 with an interruption function. This electronic text 31 is transmitted from the communications device 14 with an interruption function to the communications device 15 with an interruption function on the remote database 3 side, and then to the remote database 3 on the destination side. When the remote database 3 receives the electronic text 31, it performs the retrieving process according to the retrieval condition described in the electronic text 31, and transmits a notification using an electronic text 32 of an electronic text type 2 shown in FIG. 13 when the retrieving process is completed.

The process performed on the remote database 3 side is described below by referring to the flowchart shown in FIG. 12. The remote database 3 is waiting for a retrieval request (W6). When it receives a retrieval request in the electronic text 31 of the electronic text type 1, it starts the data retrieving process in the remote database 3 (W7). Then, it determines whether or not the retrieving process in the remote database 3 has been completed, or whether or not a stop request has arrived from the retrieval device 6 using the electronic text 32 of the electronic text type 3 shown in FIG. 13 (W8), and continues the retrieving process until the retrieving process terminates or the stop request has reached (NO in W8, W9).

When the retrieving process in the remote database 3 is completed (YES in W8), a retrieval result is output (W10). At this time, the electronic text transmitted to the retrieval device 6 is the electronic text 32 of the electronic text type 2, and the retrieval device 6 which issued a retrieval request receives the contents of the electronic text 32 as a result of the previously issued retrieval request.

On the other hand, if the retrieval device 6 determines that a necessary number of responses have been obtained as a retrieval result in the retrieving process in the flowchart shown in FIG. 11 (YES in W3), then it is not necessary to accumulate more response data in the response accumulation device 9, and a retrieval stop request is output through the communications devices 14 and 15 with an interruption function (W11). An electronic text 33 of the electronic text type 3 shown in FIG. 13 informs about the retrieval stop request. When the remote database 3 receives the electronic text 33, it immediately terminates the retrieval started by inputting the previously received electronic text 31 (of electronic text type 1), and discards all of the previously received retrieval results without transmitting them.

On the other hand, after the retrieval device 6 which issued a retrieval request outputs the above described retrieval stop request (W11), it outputs the response data accumulated in the response accumulation device 9 to the output unit 11 (W12).

As described above, after the present embodiment starts a retrieving process in the remote database 3, and if the response accumulation device 9 has accumulated the necessary number of responses, a retrieval stop request is transmitted to immediately terminate the retrieving process on the remote database 3 side. Thus, the process on the remote database 3 side is terminated, and the load on the network can be reduced, thereby omitting unnecessary retrieving processes.

In addition to the above described electronic text communications protocol, for example, a TCP/IP protocol can be used as a lower order communications protocol to realize a retrieval request and a response notification in a single connection state and discard the connection through the retrieval device 6 which issued the retrieval request without waiting for a response, thereby assuming a retrieval stop request on the retrieval device 6 side.

Fifth Embodiment

Described next is the fifth embodiment of the present invention.

The present embodiment is a data access system when databases are designed in a hierarchical structure (that is, a tree structure). First, a local database is searched, and a lower hierarchical order remote database having a higher evaluation near the local database is searched. Then, a retrieval target is moved sequentially to a higher hierarchical order remote database.

FIG. 14 shows the system configuration of the data access apparatus according to the present embodiment. In the present embodiment, the remote database 3 and the local database 7 are a part of a plurality of hierarchically designed databases. A database is specified by a corresponding inquiry control device 16. In the system configuration chart shown in FIG. 14, the components also shown in FIG. 1 are assigned the same unit number as in FIG. 1, and the descriptions about the configuration are omitted here.

In FIG. 14, the data access apparatus according to the present embodiment comprises an input unit 4, an input control device 5, a retrieval device 6, a local database 7, a response accumulation device 9, an output control device 10, and an output unit 11 in an LAN 1 enclosed by dotted lines. The retrieval device 6 is connected to the remote database 3 thorough the inquiry control device 16. The inquiry control device 16 is connected to an adjacent node table 19, and checks an inquiry destination, by referring to the adjacent node table 19, in the case when a retrieval request is issued. The inquiry control device 16 is also connected to a lower order inquiry control device 17, and a higher order inquiry control device 18.

The above described adjacent node table 19 stores the information about at least a higher order inquiry control device 18 (excluding an inquiry control device provided for the highest order node) immediately above (in the hierarchical structure) the connected inquiry control device 16, and the lower order inquiry control device 17.

FIG. 15 shows the concept of the databases designed in a hierarchical structure according to the setting information about the above described adjacent node table 19. In FIG. 15, a node 100 is the highest layer to which nodes 110 and 120 are connected as lower layers. Nodes 111 and 112 are connected as further lower layers to the node 110. A database DB 1201 is directly connected to the node 120, and a node 121 is also connected to the node 120 as a lower layer. With this configuration, a node refers to a retrieval control device, and controls the retrieval in a database connected to a node. In addition, the inquiry control device 16 is provided corresponding to each node. Therefore, databases DB 1111 and DB 1112 connected to the node 111 are retrieval-controlled by the node 111, and databases DB 1121 and DB 1122 connected to the node 112 are retrieval-controlled by the node 112. Similarly, other databases DB 1201, DB 1211, and DB 1212 are retrieval-controlled by nodes respectively connected to them.

When the above described hierarchical structure is applied to, for example, the number system of a subscriber line telephone network, databases containing the same city station numbers are accommodated in one node (retrieval control device), and a remote database having closer telephone number in the telephone number system is retrieved by priority, thereby realizing a more efficient data retrieving process. In addition to the subscriber telephone numbers, a hierarchical database group can be set up using an IP address.

Furthermore, each node can correspond to each city, town, village, or state. Practically, in FIG. 15, the node 100 can correspond to Japan, a lower node to a prefecture (for example, the node 110 refers to Kanagawa Prefecture), a lower node to a city (for example, the node 111 refers to Kawasaki City), a further lower database refers to a ward (for example, the database DB 1111 refers to the database of Nakahara Ward). When this is applied to a service of providing information about goods for sale (for example, 'PC for sale', 'CD wanted', etc.), the user can obtain the sales information in the neighborhood by priority. Therefore, when the sales of goods are settled between the parties, the goods can be delivered at a lower transportation fee or communications fee.

Described below is the data access process according to the present embodiment. First, a retrieval request is input from the input unit 4 as in each of the above described embodiments, the local database 7 is searched to read data satisfying the retrieval condition from the local database 7, and the retrieved data is accumulated in the response accumulation device 9. The above described precesses are the same as the retrieving process in the flowchart shown in FIG. 2.

Figure 16:
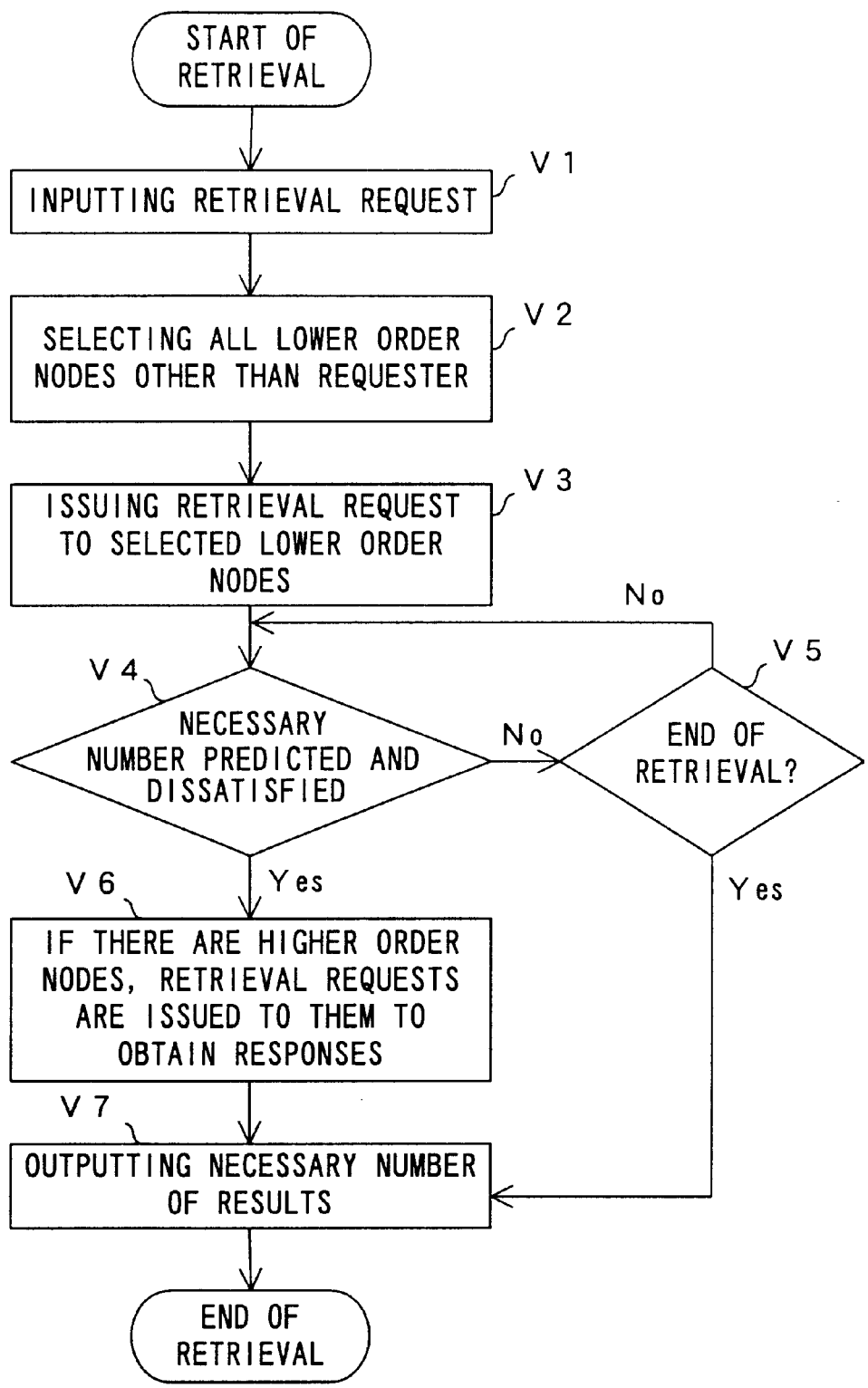
FIG. 16 is a flowchart showing the fifth embodiment of the present invention.

When the necessary number of pieces of responses data cannot be read from the local database 7, a retrieval request is issued to the remote database 3. The flowchart shown in FIG. 16 shows the processes performed after the retrieval request is input to the inquiry control device 16.

First, when the above described retrieval request is input (step (hereinafter expressed as V) 1), the inquiry control device 16 selects all lower order nodes other than the retrieval requester (V2). That is, for example, in the hierarchical structure shown in FIG. 15, the inquiry control device 16 corresponding to the node 110 selects the nodes 111 and 112. The inquiry control device 16 corresponding to the node 100 selects the nodes 110 through 112, 120, and 121. The inquiry control device 16 corresponding to the node 120 selects the node 121. By the above described lower order node selection, databases managed by the lower order nodes can be selected. In addition, when there are a plurality of databases managed by the same node as described above, and if a database is the first retrieval target, then other databases are selected.

For example, the inquiry control device 16 corresponding to the node 111 selects a database connected to a corresponding node except an already searched local database 7. For example, when the already searched local database 7 is the database DB 1111 shown in FIG. 15, the database DB 1112 connected to the corresponding node 111 is selected. It is selected by referring to the adjacent node table 19.

Next, the inquiry control device 16 requests the lower order inquiry control device 17 for managing the selected database (remote database) DB 1112 to perform a retrieving process. Thus, the node connected to the lower order inquiry control device 17 searches the database it manages (V3). If the necessary number of pieces of response data can be retrieved in the process (NO in V4), then the retrieving process terminates (YES in V5). On the other hand, if the necessary number of pieces of response data cannot be obtained from the database (for example, the database DB 1112) searched by the selected lower nodes (YES in V4), then a retrieval request is issued to other nodes through the higher order inquiry control device 18 (V6). A response number prediction device 20 indicated by the dotted lines shown in FIG. 14 predicts whether or not the necessary number of pieces of response data can be obtained from the lower order database selected by the inquiry control device 16. As a result of prediction using the response number prediction device 20, a retrieval request is issued to a higher order node even when it is determined that the necessary number of pieces of response data cannot be obtained (YES in V4, V6).

A retrieval request to a higher order node is issued by referring to the adjacent node table 19 as described above. In the above described example, a retrieval request is issued to the node 110, a higher order node to the node 111. That is, the inquiry control device 16 selects the higher order inquiry control device 18 from the adjacent node table 19, and issues a retrieval request to the node 110 through the higher order inquiry control device 18.

When the node 110 recognizes the retrieval request from a lower order node, it transmits a retrieval request to a lower order node 112 through the lower order inquiry control device 17. Thus, the node 112 performs a retrieving process on the databases DB 1121 and DB 1122, and transmits the response data obtained as a result of the retrieving process to the node 111 through the nodes 112 and 110. The node 111 outputs the necessary number of pieces of response data if they can be obtained (V7).

If the necessary number of pieces of response data cannot be obtained even after issuing a retrieval request to the node 110, then the node 111 issues to retrieval request to a further higher order node 100 through the node 110. Thus, the nodes 120 and 121 search the databases DB 1201, 1211, and 1212. A retrieval result is transferred to the node 111 through the nodes 100 and 110.

As described above, if each node cannot obtain the necessary number of pieces of response data from only the local database 7, or since data is retrieved from a database lower than the local database 7 and the node by priority according to the present embodiment, a remote database having higher retrieval evaluation is searched by priority. Therefore, an inquiry about a remote database having relatively lower evaluation can be omitted, thereby successfully reducing a load on a network and a remote database.

In the description according to the fifth embodiment of the present invention, response data read from a database managed by a node is transferred through another node. However, response data does not have necessarily be transferred through a node, but can be transmitted directly to an inquiring database. However, in this case, the node should be notified of the number of pieces of response data so that the data retrieving state can be directly checked.

In addition, the data retrieving process can be performed by providing a database and a node as combined and corresponding one to one to each other.

On the other hand, FIG. 17 shows a system for realizing the process according to the present embodiment by storing a program of a data accessing process according to the present embodiment in a portable storage medium 41 such as a floppy disk, CD-ROM, ROM, etc., or the memory of an external storage device 52, etc. such as a hard disk, etc., and by inserting the storage medium in a drive 51 of a computer 50. Otherwise, the process according to the present embodiment can also be realized by downloading a program of the present embodiment from a program provider 70 to the computer 50 through a communications line 60 such as Internet, an LAN, a WAN, etc.

Furthermore, in the descriptions about the above described five embodiments, it is assumed that the local database 7 is a local database in the LAN 1. However, the present invention can be applied to a case in which the remote database 3 is a database in a LAN with the local database 7 of a single computer.

As described above, according to the present invention, if information obtained from a specific database (local database) is sufficient, then it is not necessary to search another database. Therefore, a load on a network and other databases (remote databases) can be reduced.

In addition, while data are read from a specific database, a final number of responses is predicted, and a request to search another database is issued based on a prediction result. Therefore, the other database can be searched at an early stage, thereby shortening the retrieval time.

Furthermore, data can be efficiently retrieved by adjusting the number of retrieval requests for each database, and then issuing a retrieval request.

In addition, when a predetermined number of pieces of response data are obtained during the data retrieval, a load on a network and another database searched in parallel can be reduced by outputting a retrieval stop request to the other database to terminate the data retrieval in the other database.

Furthermore, databases are designed in a hierarchical structure to search a database connected to the same node as a specific database. As a result, a retrieving process can be performed by priority on data having high retrieval evaluation, thereby omitting the retrieval in an unnecessary database, and successfully reducing the load on a network and a database.

What is claimed is:

1. A data access apparatus functioning as a distributed retrieval system in which a plurality of databases are distributed in a network, and retrieving response data satisfying a predetermined condition based on a specific database, comprising:

a retrieval unit retrieving over the network from the specific database, and obtaining data satisfying the predetermined condition as a response;

a count unit generating count information by counting a number of pieces of response data as they are being obtained over the network by said retrieval unit searching the specific database;

a prediction unit predicting a likely number of pieces of response data to be finally obtained over the network as a result of said retrieval unit searching the specific database according to the count information from said count unit and information about the amount of data stored in the specific database; and said retrieval unit requesting over the network to search another database in the network when a number of pieces of prediction responses obtained by said prediction unit does not reach a predetermined value, where the search of the other database occurs while the data from the specific database is being obtained.

2. The apparatus according to claim 1, wherein while said retrieval unit is searching the specific database, said prediction unit obtains the predicted likely number of responses, which is proportional to the number of pieces of retrieved response data indicated by the count information and the number of records to be retrieved, relative to the number of retrieved records, and according to information about a number of pieces of retrieved response data counted by said count unit, a number of records to be retrieved in the specific database, and information about a number of retrieved records of said retrieval unit.

3. The apparatus according to claim 1, wherein said retrieval unit concurrently searches a sub-plurality of other databases in the network, and further comprising:

a retrieval stop request unit transmitting over the network a request to stop searching to the other databases when a predetermined number of pieces of response data can be obtained after issuing a retrieval request from said retrieval request unit over the network to the other databases.

4. An apparatus according to claim 1, further comprising:
a second prediction unit predicting a number of pieces of response data likely to be obtained from each of the other databases, wherein
said retrieval unit determines the particular number of pieces of response data requested over the network from each of the other databases using a prediction result of said second prediction unit.

5. An apparatus according to claim 2, wherein said retrieval unit determines the particular number of pieces of response data requested over the network from each of the other databases using a prediction result of said prediction unit.

6. A data access apparatus functioning as a distributed retrieval system in which a plurality of databases are distributed in a network, and retrieving response data satisfying a predetermined condition based on a specific database, comprising:
a retrieval unit retrieving over the network from the specific database and obtaining data satisfying the predetermined condition as a response, requesting no more than a particular number of pieces of appropriately retrieved response data from each of other databases in the network when a retrieval request message is issued over the network to the other databases, and receiving over the network response data from the other databases obtained as a result of searching each of the other databases responsive to the request message issued from said retrieval unit; and
a prediction unit predicting a number of pieces of response data likely to be obtained from each of the other databases, wherein
said retrieval unit determines the particular number of pieces of response data requested over the network from each of the other databases using a prediction result of said prediction unit.

7. A data accessing method functioning as a distributed retrieval system in which a plurality of databases are distributed in a network, and retrieving response data satisfying a predetermined condition based on a specific database, comprising:
retrieving to a search system from the specific database, and obtaining over the network data satisfying the predetermined condition as a response;
counting a number of pieces of response data obtained by said retrieving the specific database;
predicting at the search system a number of pieces of response data to be finally obtained as a result of said retrieving according to count information from said counting and according to information about an amount of data stored in the specific database; and
retrieval-requesting over the network to search another database in the network when a number of pieces of prediction responses obtained in said predicting does not reach a predetermined value.

8. A method according to claim 7, where the specific database is automatically selected based on whether it is on a local or a remote network.

9. A computer-readable storage medium, in a system functioning as a distributed retrieval system in which a plurality of databases are distributed in a network, and retrieving response data satisfying a predetermined condition based on a specific database, storing a program used to direct a computer to perform the functions of:
retrieving to a search system from the specific database, and obtaining over the network data satisfying the predetermined condition as a response to a message sent by the search system;
counting at the search system a number of pieces of response data obtained by said retrieving function searching the specific database;
predicting at the search system a number of pieces of response data to be finally obtained as a result of said retrieving function according to count information from said counting function and according to information about an amount of data stored in the specific database; and
retrieval-requesting to search another database in the network when a number of pieces of prediction responses obtained in said predicting function does not reach a predetermined value by the search system sending a retrieval request message over the network to the other database.

* * * * *